United States Patent
Henry et al.

(10) Patent No.: US 11,523,283 B2
(45) Date of Patent: Dec. 6, 2022

(54) GPS-ATTACK PREVENTION SYSTEM AND METHOD FOR FINE TIMING MEASUREMENT (FTM) IN 802.11AZ

(71) Applicant: Cisco Technology, Inc., San Jose, CA (US)

(72) Inventors: Jerome Henry, Pittsboro, NC (US); Andrew Frederick Myles, Turramurra (AU); Pooya Monajemi, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 163 days.

(21) Appl. No.: 16/985,807

(22) Filed: Aug. 5, 2020

(65) Prior Publication Data
US 2021/0258773 A1  Aug. 19, 2021

Related U.S. Application Data

(60) Provisional application No. 62/976,408, filed on Feb. 14, 2020.

(51) Int. Cl.
*H04W 12/00* (2021.01)
*H04W 76/11* (2018.01)
(Continued)

(52) U.S. Cl.
CPC ............ *H04W 12/50* (2021.01); *G01S 19/21* (2013.01); *H04W 56/0025* (2013.01); *H04W 76/11* (2018.02)

(58) Field of Classification Search
CPC ...... G01S 19/21; G01S 19/215; G01S 5/0215; G01S 5/0236; H04W 12/50; H04W 12/63;
(Continued)

(56) References Cited

U.S. PATENT DOCUMENTS 10,771,438 B2 * 9/2020 Zuniga .................. H04W 12/08
10,772,055 B2 * 9/2020 Da ........................ H04W 56/002
(Continued)

OTHER PUBLICATIONS

Yue Yu et al., "A Robust Dead Reckoning Algorithm Based on Wi-Fi FTM and Multiple Sensors", Published: Mar. 1, 2019, MDPI, Remote Sens. 2019, 11, 504; doi:10.3390/rs11050504, 22 pages.
(Continued)

*Primary Examiner* — Khawar Iqbal
(74) *Attorney, Agent, or Firm* — Edell, Shapiro & Finnan, LLC

(57) ABSTRACT

Presented herein are techniques for GPS attack prevention in association with wireless communication devices. In at least one embodiment, a method may include receiving, at a mobile device from a first access point (AP), first location information and one or more of a first token or first neighbor information relating to neighboring APs. The mobile device may receive from a second AP, second location information and one or more of a second token or second neighbor information relating to neighboring APs. The first token may be compared to the second token to determine whether the first and second tokens are consistent, and/or the first neighbor information may be compared to the second neighbor information to determine whether the first and second neighbor information are consistent. It may be determined whether the first location information provided by the first AP and the second location information provided by the second AP are valid based on the comparison(s).

20 Claims, 9 Drawing Sheets

(51) Int. Cl.
*H04W 12/50* (2021.01)
*H04W 56/00* (2009.01)
*G01S 19/21* (2010.01)

(58) Field of Classification Search
CPC ....... H04W 24/02; H04W 4/02; H04W 48/16; H04W 56/0025; H04W 64/00; H04W 76/11
See application file for complete search history.

(56) References Cited

U.S. PATENT DOCUMENTS

| | | | | |
|---|---|---|---|---|
| 10,959,078 | B2* | 3/2021 | Venkatraman | H04W 4/90 |
| 11,350,274 | B2* | 5/2022 | Watfa | H04W 16/02 |
| 2006/0274695 | A1* | 12/2006 | Krishnamurthi | H04L 9/3213 |
| | | | | 713/155 |
| 2010/0142709 | A1* | 6/2010 | Robert | H04W 12/122 |
| | | | | 380/270 |
| 2014/0161027 | A1* | 6/2014 | Larue | H04W 12/122 |
| | | | | 370/328 |
| 2015/0304810 | A1* | 10/2015 | Jalali | H04W 56/001 |
| | | | | 370/336 |
| 2017/0149799 | A1* | 5/2017 | Vamaraju | G01S 13/767 |
| 2017/0374034 | A1* | 12/2017 | Zuniga | H04L 63/0407 |
| 2018/0124584 | A1* | 5/2018 | Venkatraman | H04W 76/14 |
| 2022/0191782 | A1* | 6/2022 | Ratasuk | H04W 52/0212 |

OTHER PUBLICATIONS

Kevin Stanton et al., "Addition of p802.11-MC Fine Timing Measurement (FIM) to p802.1AS-Rev: Tradeoffs and Proposals", IEEE 802.1 Plenary, Rev 0.9, Mar. 9, 2015, 22 pages.

Bernard Aboba, "IEEE P802.11 Wireless LANs", IEEE 802.1X Pre-Authentication, doc.:IEEE 802.11-02/TBDr0, May 14, 2002, 41 pages.

Charalambos Konstantinou et al., "GPS Spoofing Effect on Phase Angle Monitoring and Control in an RTDS-based Hardware-In-The-Loop Environment", IET Journals The Institution of Engineering and Technology, 2017, IET Cyber-Physical Systems: Theory & Applications, retrieved from Internet Aug. 5, 2020, pp. 1-8.

IEEE, "IEEE Standard for Information technology—Telecommunications and information exchange between systems Local and metropolitan area networks—Specific requirements—Part 11: Wireless LAN Medium Access Control (MAC) and Physical Layer (PHY) Specifications", IEEE, Dec. 14, 2016, 3534 pages.

Wikipedia, "Spoofing attack", Wikipedia, 2 pages, retrieved from Internet Aug. 5, 2020; https://en.wikipedia.org/wiki/Spoofing_attack#gps_spoofing.

* cited by examiner

FIG.5

| SUBELEMENT ID | NAME |
|---|---|
| 0 | RANGING NEIGHBOR LIST |
| 1 | NEIGHBOR COUNT |
| 2 | 1st NEIGHBOR BSSID |
| 3 | 1st NEIGHBOR CURRENT TOKEN |
| 4 | 1st NEIGHBOR NEXT TOKEN |
| 5 | 1st NEIGHBOR TOKEN LIFETIME |
| 6 | 1st NEIGHBOR LCI |

GPS-ATTACK PREVENTION SYSTEM AND METHOD FOR FINE TIMING MEASUREMENT (FTM) IN 802.11AZ

PRIORITY CLAIM

This application claims priority to U.S. Provisional Application 62/976,408, filed Feb. 14, 2020, the entirety of which is incorporated herein by reference.

TECHNICAL FIELD

The present disclosure relates to prevention or mitigation of Global Positioning System (GPS) attacks.

BACKGROUND

Fine Time Measurement (FTM), as implemented in IEEE 802.11-2016, is inherently insecure. Communications are not encrypted or authenticated. A client (initiating station (ISTA)) has no means to verify the truthfulness of timers or the Location Configuration Information (LCI) (geo-position) returned by an access point (AP), and used by the client to deduce its own geo-position.

As such, it is trivial for an attacker to poison the client-to-AP dialog by spoofing a media access control (MAC) address and injecting fake requests, fake timers, etc. Alternatively, a "GPS-attack" may be initiated by sending fake LCI information to the client (spoofing the AP MAC address or simply offering FTM service as an AP), and as a result, slowly push the clients to a wrong destination (e.g., a competitor store nearby).

BRIEF DESCRIPTION OF THE DRAWINGS

FIG. 5 illustrates an example ranging neighbor list format, according to an example embodiment.

DESCRIPTION OF EXAMPLE EMBODIMENTS

Overview

Figure 1:
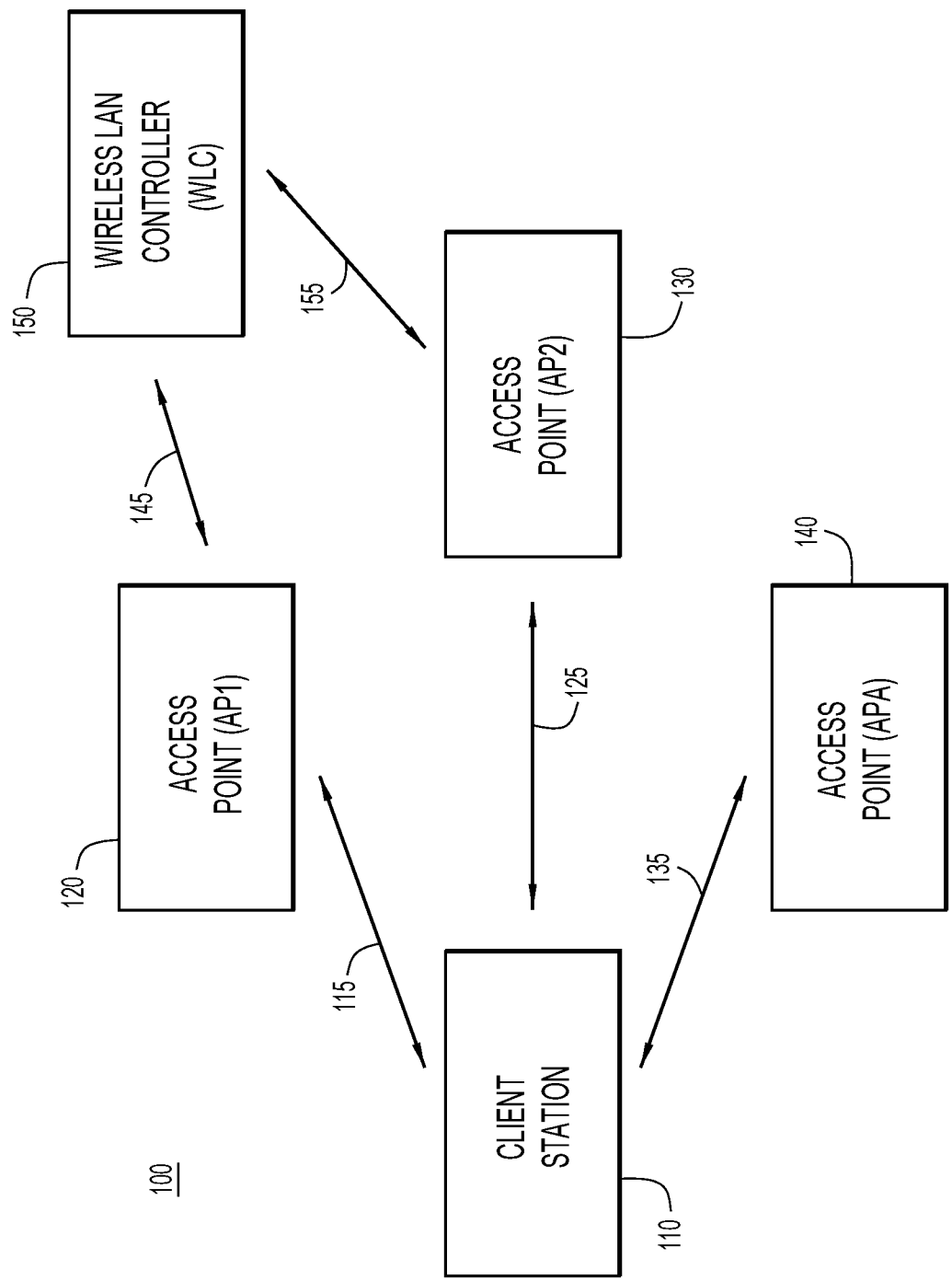
FIG. 1 is a high-level block diagram of a system for GPS attack prevention in wireless communication ranging services, according to an example embodiment.

Presented herein are techniques for GPS attack prevention in association with wireless communication devices.

In one embodiment, a method is provided that includes receiving, at a mobile device from a first access point, first location information and first neighbor information relating to neighboring access points, receiving, at the mobile device from a second access point, second location information and second neighbor information relating to neighboring access points, comparing the first neighbor information to the second neighbor information to determine whether the first neighbor information and the second neighbor information are consistent, and determining whether the first location information provided by the first access point and the second location information provided by the second access point are valid based on the comparing.

In one embodiment, a method is provided that includes receiving, at a mobile device from a first access point, first location information and a first token, receiving, at the mobile device from a second access point, second location information and a second token, comparing the first token to the second token to determine whether the first token and the second token are consistent, and determining whether the first location information provided by the first access point and the second location information provided by the second access point are valid based on the comparing.

EXAMPLE EMBODIMENTS

Geo-Positioning System (GPS) attacks are known to occur. Such attacks include those where the attacker overrides a valid GPS signal (stronger signal), pretending to be a GPS satellite, and inserting invalid measures to push a target away from its trajectory. Mitigation techniques exist, but they are limited to receiver computations (e.g., satellite signal strength with computed distance comparison, etc.). Coherence computations may be performed whereby a single satellite providing ranging incompatible with that of the others may be discarded. However, no technique exists at the level of the satellite-client dialog (because GPS is a one-way process).

The IEEE 802.11az specification improves Fine Timing Measurement (FTM) security by leveraging an encryption mode, called Pre-Association Security Negotiation (PASN), by which an unassociated client creates a secure session to an AP before performing ranging with that AP. PASN is implemented in 802.11az to limit the attack surface (exposure) of FTM exchanges. PASN brings data exchange obfuscation, but no authentication. Other techniques may be employed to protect the exchanges between the client and AP and may suffer from the same or similar deficiencies of PASN with respect to authentication. In other words, with PASN or other similar techniques, although the link of the FTM exchanges is protected from injection and eavesdropping, the AP itself is not authenticated. This mode protects against spoofing attacks directed toward an active client-AP ranging session, however, this protection only somewhat mitigates the above problems associated with GPS attacks. An attacker can still pretend to be a valid AP and perform the GPS attack, and an attacker can still spoof the MAC address of a valid AP and establish a new secure session with the client for the next ranging attempt. Once this has happened, the legitimate AP is the one appearing to be a rogue. An attacker can still insert into the FTM process and poison the user measurements.

For example, a wrong or changing Location Configuration Information (LCI), invalid and shifting of times t1 and t4 in the ranging exchange can set a moving initiating station (ISTA) off course. The time, t1, is a time of departure (ToD) of an FTM frame from a responder station (RSTA) transmitted to an ISTA as part of an FTM process or protocol. The FTM frame is received at the ISTA at a time, t2, the ISTA responds with an FTM frame to the RSTA at a time, t3. A time of arrival (ToA), t4, is a time of arrival at the RSTA of the FTM frame sent from the ISTA to the RSTA at t3. The ISTA knows times t2 and t3, but does not have times t1 or t4, so in the subsequent frame, the RSTA sends the times t1/ and t4 of the previous exchange.

Generally, an ISTA cannot know in advance valid RSTAs from invalid RSTAs. The ISTA scans, then detects RSTAs, and uses any responding RSTA in range, regardless of the advertised Service Set Identifier (SSID). For example, even if fourteen (14) APs advertise an SSID of "mall" and one advertises an SSID of "Free Internet," the ISTA could use the AP advertising the SSID of "Free Internet." For example, the AP advertising the SSID of "Free Internet" may be an invalid or attacker RSTA and may provide invalid or inaccurate information. The attacker can then provide RSTA service, and alter its LCI progressively, or the times t1 and t4 progressively to inject a false position to the ISTA, bringing the mobile ISTA off-course. This may be considered a "classic GPS attack."

An RSTA infrastructure providing ranging or FTM services is likely composed of multiple APs. These APs are likely configured by the same Autonomous System (AS), entity, and/or organization and communicate with each another, which can be leveraged to make RSTA GPS attacks more difficult.

FIG. 1 is a high-level block diagram of a system for GPS attack prevention in wireless communication ranging services, according to an example embodiment. The system 100 includes a client station 110, and a plurality of access points (APs). As shown in FIG. 1, the system 100 includes the client station 110, a first access point (AP1) 120, and a second access point (AP2) 130. A third access point (shown as APA) 140 is an attacker AP, such as, for example, a rogue AP or an evil twin AP. Also shown in FIG. 1 is a wireless local area network controller (WLC) 150. The client station 110 may communicate with the first access point 120, the second access point 130, and the third access point 140, respectively, via wireless communication links shown at 115, 125, and 135.

The WLC 150 may monitor and control the first access point 120 and the second access point 130. The WLC 150 may communicate with the first access point 120 and the second access point 130, respectively, via communication links shown at 145 and 155. For example, each of the communication links shown at 145 and 155 may include one or more wired or wireless connections that enables the WLC 150 to communicate information to the first access point 120 and the second access point 130, respectively. The WLC 150 may be configured to communicate with the first access point 120 and the second access point 130 and send to and/or receive from the first access point 120 and/or the second access point 130 various information. For example, the WLC 150 may distribute one or more tokens to the first access point 120 and the second access point 130. The WLC 150 may generate the token(s) and/or may distribute other information along with the token(s), either in a separate communication or the same communication. The WLC 150 may be responsible for distributing, to the first access point 120 and/or the second access point 130, location information, neighbor information, token(s), token information, and/or any other shared information that may be indicative of validity of location information provided by the first access point 120 and/or the second access point 130.

The client station 110 may be configured to communicate with access points and receive various information from the access points including, for example, location information, neighbor information relating to neighboring access points, and/or tokens. For example, the client station 110 may receive, from the first access point 120, first location information, first neighbor information relating to neighboring access points of the first access point, and a first set of one or more tokens. The client station 110 may receive, from the second access point 130, second location information, second neighbor information relating to neighboring access points of the second access point 130, and a second set of one or more tokens. For example, the client station 110 may receive the first location information, the first neighbor information, the first set of one or more tokens, the second location information, the second neighbor information, and/or the second set of one or more tokens as a part of a secure communication association or pre-association process, such as the aforementioned PASN process. It is to be understood that PASN is only an example and that the disclosure is not limited for use with PASN to protect links and/or exchanges between ISTAs and RSTAs, clients and APs, and/or any other links and/or exchanges between stations, devices, systems, etc. that may be desired to be protected. It is to be understood that other techniques may be employed additionally or alternatively to PASN to protect such links and/or exchanges or no protection may be employed. The solutions presented herein may be used with such other techniques.

In this example, the first access point 120 and the second access point 130 are valid access points, and the third access point is an invalid access point. In accordance with at least some techniques presented herein, each of the first access point 120 and the second access point 130 may be configured to provide location information, neighbor information relating to neighboring access points, and one or more tokens (e.g., to a client station). As the first access point 120 and the second access point 130 are valid access points that are neighbors of each other, the first neighbor information may include locations for each neighboring access point of the first access point 120 (e.g., the second access point 130) and the second neighbor information may include locations for each neighboring access point of the second access point 130 (e.g., the first access point 120).

Because the third access point 140, in this example, is an attacker AP, neither the first neighbor information nor the second neighbor information may be consistent with neighbor information received from the third access point 140. Additionally or alternatively, because the third access point 140 is an attacker AP, neither the first set of one or more tokens nor the second set of one or more tokens may be consistent with token(s) received from the third access point 140. As such, at least one of neighbor information provided by the third access point 140 and/or tokens provided by the third access point 140 to the client station 110 would not be consistent with valid neighbor information and/or valid tokens.

In an example embodiment, the client station 110 may be configured to compare the first neighbor information to the second neighbor information to determine whether the first neighbor information and the second neighbor information are consistent. For example, the client station 110 may determine that the first neighbor information and the second neighbor information are consistent if the first neighbor information includes information relating to the second access point 130 and the second neighbor information includes information relating to the first access point 120. Based on the comparison, the client station 110 may determine whether the first location information provided by the first access point and the second location information provided by the second access point are valid. For example, if the client station 110 determines that the first neighbor information and the second neighbor information are consistent, the client station 110 may determine that the first location information provided by the first access point 120 and the second location information provided by the second access point 130 are valid. In this example, the client station 110 determines that the first neighbor information and the second neighbor information are consistent.

On the other hand, if the client station 110 determines that the first neighbor information and the second neighbor information are inconsistent, the client station 110 may determine that at least one of the first location information provided by the first access point 120 and the second location information provided by the second access point 130 is invalid. Inconsistency of neighbor information received from access points may indicate that one or more of the access points is an attacker access point.

Based on the determination that the first neighbor information and the second neighbor information are consistent, the client station 110 may determine that the first location information provided by the first access point 120 and the second location information provided by the second access point are valid. For example, the client station 110 may be configured to determine that the first location information provided by the first access point 120 and the second location information provided by the second access point 130 are valid if the first neighbor information and the second neighbor information are consistent and if the first access point 120 and the second access point 130 correspond to a majority of access points known to the client station 110. For example, the first access point 120 and the second access point 130 may be the first two access points that the client station from which the client station 110 receives location information and/or from which the client station 110 uses in determining validity of location information.

To determine which, if any, of the first location information provided by the first access point 120 and the second location information provided by the second access point 130 is valid, the client station 110 may compare the first neighbor information and/or the second neighbor information to neighbor information provided by one or more other access points, if any. For example, if the first neighbor information and the second location information are inconsistent, the client station 110 may determine whether there is any neighbor information from one or more other access points(s). If there is neighbor information from one or more other access points, the first neighbor information and/or the second neighbor information may be compared to the other neighbor information. If the first neighbor information is consistent with the other neighbor information, the first location information may be determined to be valid. In such a case, the second location information may be determined to be invalid (e.g., without comparing the second neighbor information to the other neighbor information.) If the first neighbor information is inconsistent with the other neighbor information, the first location information may be determined to be invalid. If the second neighbor information is consistent with the other neighbor information, the second neighbor information may be determined to be valid.

The client station 110 may be configured to store information received from access points. This information may be used in making determinations about the validity of information provided by the access points. As additional information is received, validity/invalidity determinations may change. For example, the client station 110 may receive first neighbor information and the first access point. If the client station 110 compares the first neighbor information to the third neighbor information, the client station 110 may determine that the first neighbor information to the third neighbor information are inconsistent.

The client station 110 may be configured to compare some or all of the elements of a neighbor list received from an AP to corresponding element(s) of a neighbor list received from a next AP. If there is a discrepancy, at least one of the APs may not be valid, and the client station 110 can use neighbor list information from one or more other APs (e.g., other APs that have provided neighbor list information to the client station 110) to determine validity of location information provided by the AP and/or the next AP.

Further details on these operations are described below.

Figure 2:
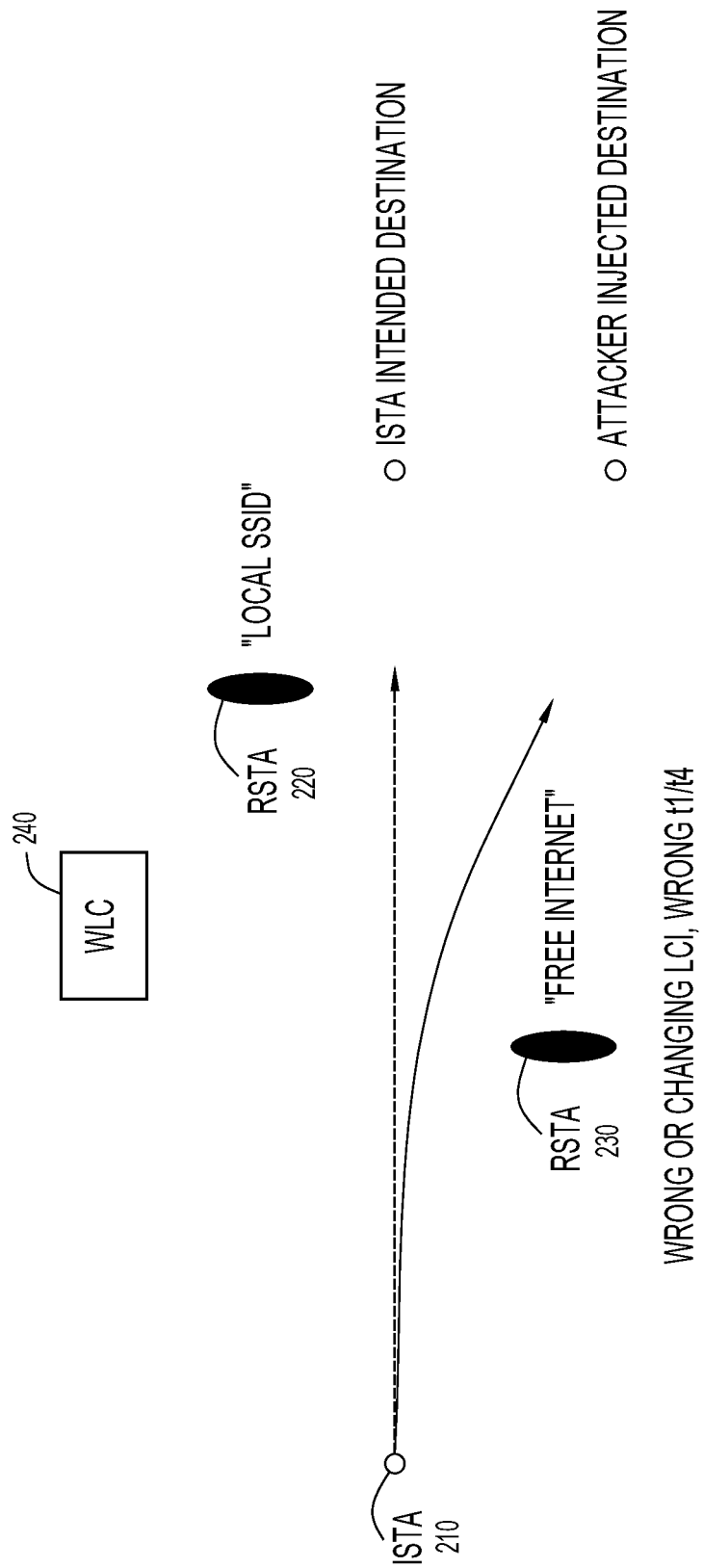
FIG. 2 is a diagram of an example rogue AP scenario in a wireless communications network environment.

FIG. 2 is a diagram illustrating an example rogue AP scenario. There are an ISTA 210, a first RSTA 220 advertising "Local SSID," and a second RSTA 230 advertising "Free Internet" in a wireless communications network environment. Also shown in FIG. 2 is WLC 240. In this example scenario, the second RSTA 230 is the rogue AP. The WLC 240 may monitor and control the first RSTA 220. It is to be understood that the WLC 240 may monitor and control a plurality of RSTAs. For example, the first RSTA 220 may be one of a plurality of RSTAs advertising "Local SSID" and that are valid, and the WLC 240 may monitor and control the plurality of RSTAs that are valid. PASN does not protect against rogue APs. A rogue AP on a mobile device can advertise any SSID and offer ranging services. The IEEE 802.11az procedures do not include filtering or preference mechanisms.

Figure 3:
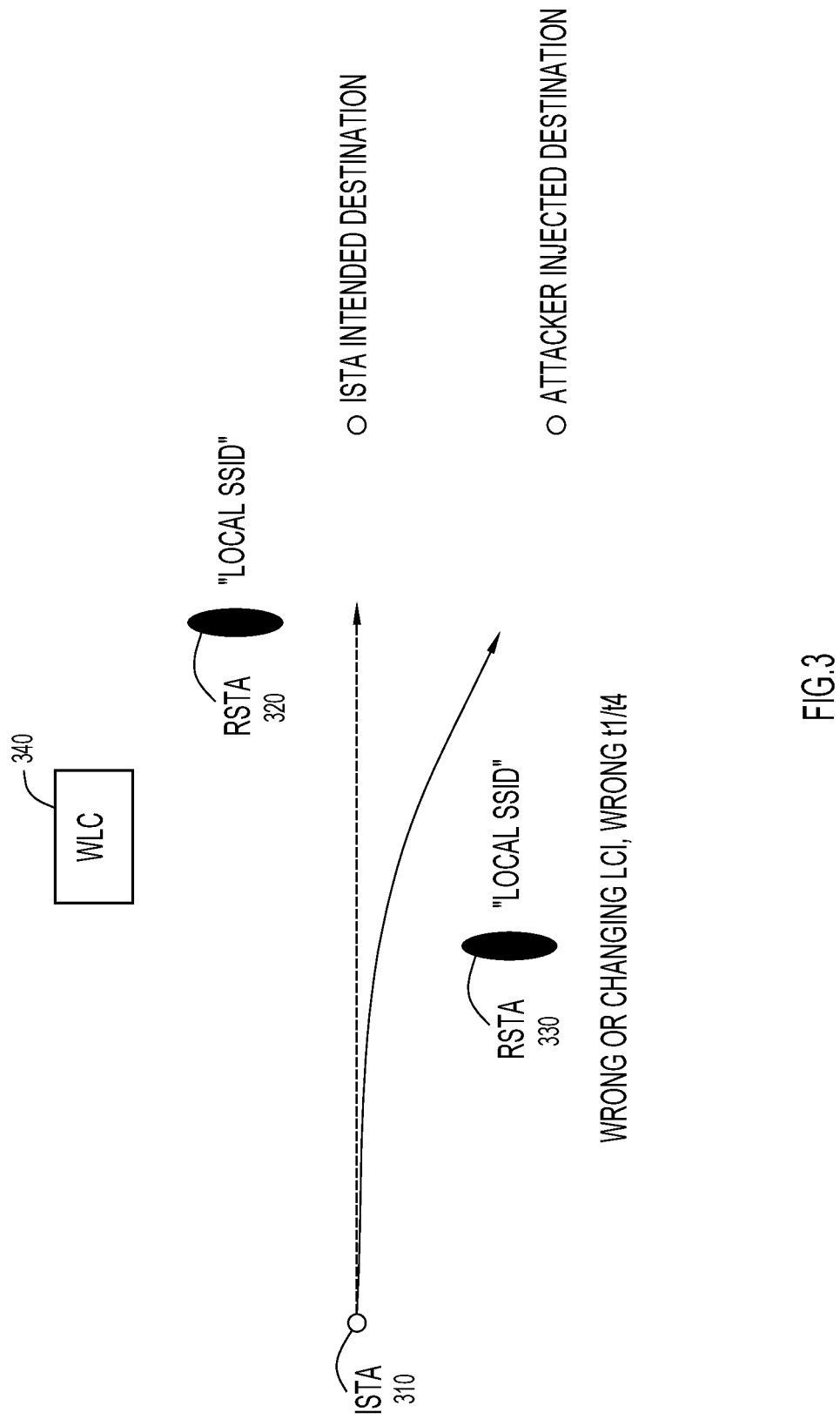
FIG. 3 is a diagram of an example evil twin scenario in a wireless communications network environment.

FIG. 3 is a diagram illustrating an example evil twin scenario. Shown in FIG. 3 are an ISTA 310, a first RSTA 320 advertising "Local SSID", and a second RSTA 330 advertising "Local SSID." Also shown in FIG. 3 is a WLC 340. The WLC 340 may monitor and control the first RSTA 320. It is to be understood that the WLC 340 may monitor and control a plurality of RSTAs. For example, the first RSTA 320 may be one of a plurality of RSTAs advertising "Local SSID" and that are valid, and the WLC 340 may monitor and control the plurality of RSTAs that are valid. In this example scenario, the second RSTA 330 is the evil twin. PASN does not protect against evil twins. An attacker can impersonate the local dominant SSID. The IEEE 802.11az procedures do not provide a mechanism to identify evil twins that are providing ranging services. In this example, despite advertising "Local SSID" like the first RSTA 320, the second RSTA 330 is not under the control of the WLC 340 as the second RSTA 330 is an evil twin.

Accordingly, there is a need for a system and method to ensure that a client entering a public venue has a reasonable way to ensure that it will only range against valid APs, thus reducing or eliminating the feasibility of GPS attacks.

Figure 4:
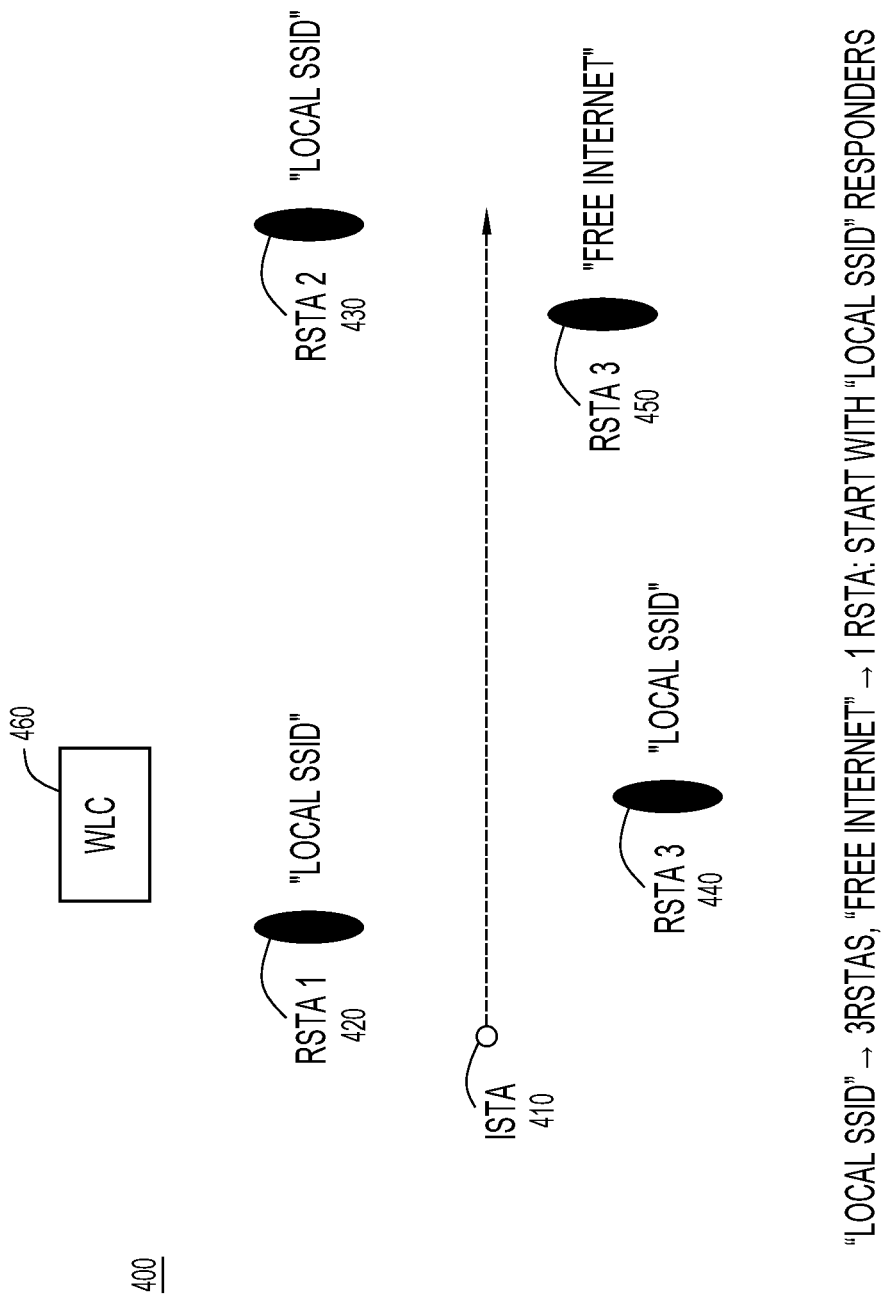
FIG. 4 is a diagram illustrating a wireless communication network environment in which neighbor list protection techniques may be implemented, according to an example embodiment.

FIG. 4 is a diagram illustrating a wireless communication network environment 400 in which neighbor list protection techniques may be implemented, according to an example embodiment. Shown in FIG. 4 is an ISTA 410, RSTA 1 420, RSTA 2 430, RSTA 3 440, and RSTA 450. Each of RSTA 1 420, RSTA 2 430, RSTA 3 440 is advertising "Local SSID," and RSTA 450 is advertising "Free Internet." Also shown in FIG. 4 is a WLC 460. The WLC 460 may monitor and control the RSTA 1 420, the RSTA 2 430, and the RSTA 3 440. The ISTA 410 may start with the APs representing the largest detected system (top n BSSID for detected SSID). In this example, three RSTAs are advertising the Local SSID (i.e., RSTA 1 420, RSTA 2 430, and RSTA 3 440), and only one of the RSTAs (i.e., RSTA 450) is advertising "Free Internet." The ISTA 410 can start with the "Local SSID" responders.

The ISTA 410 may sort the RSTAs by SSID and may determine the number of APs for each SSID. For example, the RSTAs advertising "Local SSID" may form a group and the RSTA advertising "Free Internet" may form a group.

Each of the RSTAs 420, 430, and 440 may have information relating to the other RSTAs in the group. For example, RSTA 420 may have neighbor information relating to RSTAs 430 and 440 and/or one or more tokens relating to RSTAs 430 and 440. Likewise, RSTA 430 may have neighbor information relating to RSTAs 420 and 440 and/or one or more tokens relating to RSTAs 420 and 440, and RSTA 440 may have neighbor information relating to RSTAs 420 and 430 and/or one or more tokens relating to RSTAs 420 and 430.

In an example embodiment, the RSTAs 420, 430, and 440 may be configured to communicate with each other. This communication may be direct and/or indirect.

In an example embodiment, each of the RSTAs 420, 430, and 440 may communicate with and/or be under the control of the WLC 460. The WLC 460 may be responsible for distributing, to the RSTAs 420, 430, and 440, location information, neighbor information, token(s), token information, and/or any other shared information that may be indicative of validity of location information provided by the RSTAs 420, 430, and 440 of the group.

In an example embodiment, the WLC 460 may generate tokens for the RSTAs of the group. The tokens may be individually unique to each RSTA or may be unique to the group as a whole. In an example embodiment, a token(s) may be valid for a period of time. For example, tokens may be rotated every n seconds (where n is a number). In an example embodiment, the WLC 460 may generate a batch of tokens for the RSTAs and may distribute the batch of tokens to the RSTAs. The WLC 460 may distribute lifetime information for each token of the batch corresponding to a period of time for which the respective token is valid. For example, the WLC 460 may distribute a batch of five tokens, token1, token2, token 3, token4, token5, and may distribute lifetime information that indicates that each token is to be valid for one second, that the tokens are to be rotated each second starting with token1 and proceeding tokens2-tokens5, and that only one token is to be valid at any given time. It is to be understood that the example lifetime information described is only an example, and that any suitable lifetime information or parameters may be used. In an example embodiment, the WLC 460 may distribute a seed value or key which the RSTAs of the group use (e.g., as input) to generate the tokens using a common function. All of the tokens of a batch may have the same lifetime information, or the lifetime information may be different for one or more of the tokens of a batch of tokens.

The ISTA 410 may use information received from RSTAs 420, 430, and 440 of the group to build or identify a list of valid RSTAs with which a ranging procedure may be performed. In other words, the ISTA 410 may use information shared amongst the group to determine that an RSTA is trusted by the group and location information provided by the RSTA and others in the group may be used by the ISTA 410 in determining its own position. If an RSTA (e.g., RSTA 450) does not provide information consistent with the other RSTAs, the ISTA 410 may flag the RSTA as suspicious or may discard the information received from the RSTA. Whether or not the ISTA 410 flags an RSTA as suspicious, or discards the information provided by the RSTA and flags the RSTA as invalid, may depend on the information provided by RSTAs that are valid and known to the ISTA. For example, as an ISTA communicates with RSTAs, the list of valid RSTAs may grow, and RSTAs that were flagged as suspicious or tentatively untrusted may be determined to be invalid or valid.

For example, if one of the first two RSTAs from which the ISTA receives information is rogue and the other is valid, absent additional information, the ISTA would not be able to know which of the two RSTAs is rogue and which is valid. These two RSTAs may be flagged as suspicious or tentatively untrusted until additional information is obtained for the ISTA to be able to determine which is rogue and which is valid. For example, a third RSTA may provide information consistent with one of the two RSTAs, and the ISTA may determine the RSTA that provided the consistent information is likely valid and the RSTA that provided the inconsistent information is likely rogue.

The AP may suggest a list of neighbors. For example, the AP may provide to the detected ISTA a list of neighbors using a neighbor report (e.g., a modified 802.11k neighbor report). The neighbor report may be or include a frame listing channels and BSSIDs (e.g., MAC addresses of expected APs on these channels, and tokens for each of these APs). The AP may provide a list of neighbors that includes neighbors only under the same AS. APs may scan other channels at intervals, and may report to their WLC the APs they "see." The WLC may then return a list of APs that are valid or trusted. These may be advertised to ISTAs. As such, a rogue AP and channel would not be mentioned or included in the report.

In another example embodiment, the AP may use a neighbor request of type FTM (e.g., an 802.11 neighbor request of type FTM). In this mode, in an example, the AP does not simply send (solicited or unsolicited) a list of neighbors, but rather may ask the ISTA "go scan these APs and report back," which may include tokens for each AP. The ISTA may then scan as requested by the AP and come back to the channel. This information received/derived from the scan, such as, for example, the distances from the ISTA to the APs that the ISTA scanned and/or tokens may be used by the ISTA to limit the ISTA to scan to known APs and channels.

A new neighbor list for IEEE 802.11az is provided. The neighbor list is used to limit the exposure for GPS attacks. The neighbor list may include one or more additional and/or different fields than those included in conventional neighbor lists.

Neighbor List Protection: Once a PASN session is established, the RSTA could send to the ISTA an FTM session token. Token information element (IE) could include, for example, a current token value, a lifetime, and/or a next token value. Upon returning its LCI, the RSTA could then deliver an FTM neighbor list. For each valid neighbor known by the RSTA, the neighbor BSSID and token IE are provided. An RSTA is able to determine whether its neighbor is valid because all of these APs are connected to the same system under the same AS—in some network architectures, this means the same group of WLCs. Then, the APs typically exchange neighbor discovery messages that are analyzed (at the WLC or the AP level, for example, depending on the network architecture) to validate which neighboring APs are part of the same system (e.g., they use a common hash). In an example with WLCs, the WLC would send to all APs the same common list of participating APs and tokens.

FIG. 5 illustrates an example format of a ranging neighbor list 500, according to an example embodiment. In order to pretend to "belong," an attacker would need to collect the main system's tokens faster than the refresh cycle. Token computation may be implementation dependent.

The ranging neighbor list 500 may include, for example, a subelement ID field 502 and a name field 504. As shown in FIG. 5, subelement IDs 0-6 correspond, respectively, to ranging neighbor list, neighbor count, first neighbor BSSID, first neighbor current token, first neighbor next token, first neighbor token lifetime, first neighbor LCI.

Next BSSID PASN Protection: Once the ISTA establishes a PASN session to the next RSTA, within 2×token_lifetime, the ISTA validates the RSTA LCI and token values. If the token or LCI do not match, the ISTA flags both systems as doubtful, and ranges against the neighbors provided by the first AP and the second AP, alternatively. Once a group coherence is found, the incoherent group is discarded.

GPS attacks are difficult to prevent as ISTA-RSTA authentication cannot be achieved in most cases. However, a secure neighbor list can greatly limit the attack exposure. The techniques presented herein may be employed to make it more difficult for attackers to be successful with GPS attacks. To be successful, an attacker would need to deploy a system as large as the target network, or refresh its knowledge of the target network faster than the token refresh cycle. (An undetected attacker that becomes larger than the legitimate network may serve the de-facto source of truth for ranging.)

Figure 6:
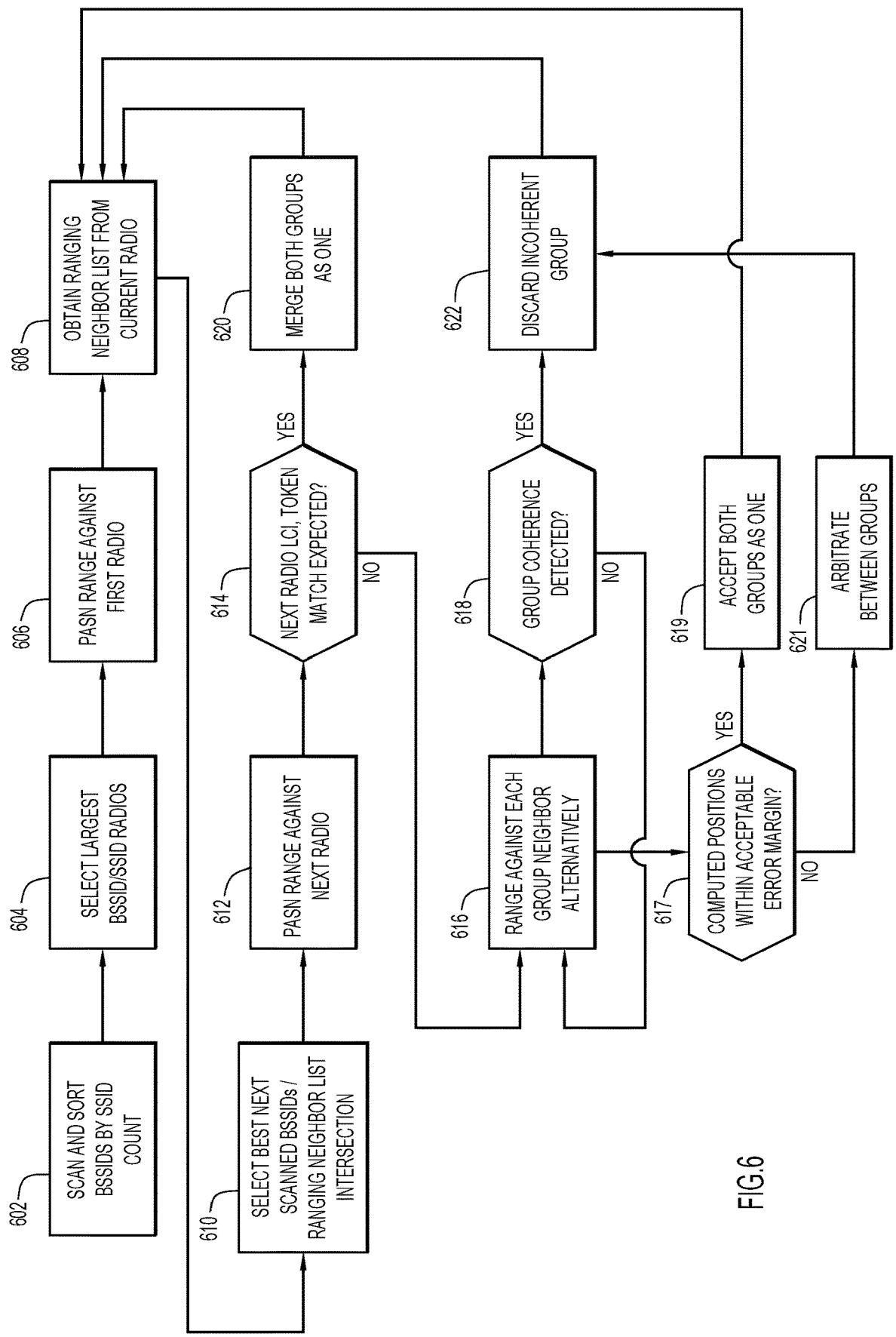
FIG. 6 is a diagram illustrating an operational flow of a process for preventing a GPS attack, according to an example embodiment.

A solution is presented herein that solves the GPS attack problem by adding neighbor identity validation parameters to the 802.11az PASN ranging scheme. An operation flow according to an example use case of a system employing the GPS attack prevention techniques presented herein is now described, with reference to FIG. 6. The operations are as follows.

1. A client entering a venue scans the various bands to detect APs (acting as RSTAs). The client operates a BSSID-to-SSID count (i.e., which BSSIDs support which SSID). For example, at 602, the client may scan and sort BSSIDs by SSID count.

2. The client selects for ranging the largest BSSID-to-SSID ratio with usable received signal strength indicator (RSSI) distribution, i.e., the client preferences the APs that serve the SSID most commonly found through the scanning. The system displaying the largest BSSID-to-SSID ratio is, in other words, the largest radio count for a given SSID. (An attacker would need to spoof more media access control (MAC) addresses than the infrastructure in order to be selected; using a fake AP would fail as all BSSIDs have equivalent RSSI signatures). This step brings the client to seek location from the dominant network. For example, at 604, the client may select the largest BSSID/SSID radios.

3. Once the client establishes a PASN session to one AP (at operation 606), a token is provided. For example, the client may establish a PASN session to a first AP.

3a. In an example embodiment, the client generates an FTM ISTA session token (e.g., a nonce) and communicates the FTM ISTA session token over the encrypted session (PASN session) to the AP. The AP passes the FTM ISTA session token to neighboring AP(s).

3b. In another example embodiment, the AP exposes to the client an FTM RSTA session token. This token identifies the AP for the FTM session. The token IE includes, for example, a token value, a lifetime, and a next token value. This token is computed by an AP for a group of APs (e.g., a WLC), individual to each AP, and distributed at intervals to each participating AP. Generally, the IE includes a temporal identifier for the RSTA performing the FTM function. In this example, the token is a nonce, and the next token is the next nonce the RSTA (here, an AP) will use. For example, the AP can communicate that it uses a first token (e.g., a first nonce), that the first token is valid for the next n seconds (e.g., 3 seconds), and that it will then use a second token (e.g., a second nonce). If the ISTA comes back after n seconds, it should hear from the RSTA that it uses the second token, that the second token is valid for the next x seconds (which may be the same or different as n), and that the next token will be a third token (e.g., a third nonce). The ISTA may range with a given RSTA a few times as the ISTA moves through an environment.

It is to be understood that some systems may implement either operations 3a or 3b, or both of these operations. In both 3a and 3b, the token can be a seed (i.e. one side sends a key and a token to the other side, then as the client moves, the sending side sends a new token that can be verified with the initial key).

4. Upon returning the LCI over the protected link, the AP also returns an LCI neighbor map (at operation 608). This map includes the BSSID of neighboring APs from the same extended basic service set (ESS), along with their geo-coordinates. When operation 3b is implemented, the IE also includes each neighboring AP current RSTA token IE. The client selects the next BSSID among the one or more scanned BSSIDs that are on the ranging neighbor list (at operation 610).

4a. In an example embodiment, the LCI neighbor map includes the n APs closest to the current AP.

4b. In another example embodiment, the LCI neighbor list is customized. The customized list may include APs that are preferred for ranging. For example, AP(s) may be preferred to other AP(s) for ranging because the preferred AP(s) may have lower channel utilization (CU), load, and/or client count than the other APs, and the WLC may provide such information about CU, load, client count, and/or any other information that may be used to determine AP(s) that are preferred over other AP(s). As another example, AP(s) may be preferred because the system has learned over multiple clients which combination of APs provides the best accuracy-to-airtime consumption ratio using any techniques now known or hereinafter developed. For example, based on the client detected position and/or form factor, and the density of other clients, the AP determines what is best set of APs to respond to that client and what the optimal FTM characteristics would be (e.g., burst count, duration, interval, frame per burst, etc.).

5. Next, when the client establishes a PASN session to the next AP, the client favors the APs that were returned in the LCI neighbor list (at operation 612).

6. As the session is established, the FTM token and LCI are verified, for example, according to an ISTA FTM token technique and/or an RSTA FTM token technique (at operation 614).

6a. With the ISTA FTM token technique, the client verifies that the AP LCI matches the information returned by the first AP. In other words, as the ISTA establishes its PASN session to the next (here, second) AP, the ISTA verifies the LCI announced by the second AP, and checks that it matches what the first AP announced that the LCI of the second AP would be (in the neighbor list). If the information does not match, the client jumps to operation 6d below. If the information matches, the client sends its ISTA FTM token and first ranging AP BSSID to the new AP (the second AP in this example) (operation 620). The new AP (like all neighbor APs) should have received this information from the first AP. The new AP verifies that it has a record of that token and AP source. If there is a mismatch, the AP terminates the FTM session. If the information does not match what the new AP knows, then, for example, someone is spoofing the client MAC address and is trying to insert into the FTM exchange, and the AP rejects the client (terminates the session).

It is to be understood that the client can then restart a new session with the new AP (and generate a new token).

The ISTA FTM token technique allows the unassociated client to rotate its MAC address, as the token and AP ID are used as client validation; thus the client MAC address is not needed.

6b. With the RSTA FTM token technique, the client verifies the AP token and LCI values.

6c. If the token and LCI match the expected values, the client continues using that AP for ranging (and the process repeats from operation 4 above). This way, an attacker spoofing the SSID would need to be known and approved by the infrastructure to be a valid next AP for that client.

6d. If the token or LCI does not match the expected values, then the client flags the local AP and the first AP as doubtful, and temporarily (e.g., <1 second scale, until a threshold number of measurements are obtained from other APs, etc.) ignores the computed measurement. The client also returns a Location Measurement Report (LMR) incoherence IE to the first AP. The client then continues ranging against other APs using known techniques, but alternating neighbors suggested by the first and second APs (at operation 616).

7. If one of the two systems returns incoherent values (e.g., no LCI neighbor list, no token, and/or inconsistency with previous AP information) (at operation 618), the client ignores that system and continues using the first one (at operation 622).

8. If both systems continue to provide usable neighbors, the client continues ranging against both systems, alternatingly. As the client obtains enough samples from both groups, it compares the results (at operation 617). Whether the client has obtained enough samples from the groups to compare the results to make a determination as to validity of the APs may be configurable and may be based on probability. For example, if the client obtains samples from each side and they are inconsistent, the probability that one of the two APs are valid may be 50%. If a third measurement is obtained for a third AP that is consistent with the measurement of the first AP, the probability that the first and third APs are valid may be approximately 67% and the probability that the second AP is invalid may be 33%. Stated another way, the probability that the first and third APs are invalid may be 33% and the probability that the second AP is valid may be 67%. In an example embodiment, greater than or equal to a threshold number of consistent APs may be identified before a determination is made as to using or discarding a group of AP(s). For example, a client may be configured to use a group of APs if at least three APs are consistent with each other and a probability of at least 70% (e.g., if 10 APs are queried, at least 7 APs are to provide results that are consistent with each other for validity to be determined). Further to this example, if two APs are consistent in a row, a third AP may still be needed to meet the minimum threshold.

8a. If both computed positions are within an acceptable error margin, the client accepts both systems as one ("disconnected neighbors") (at operation 619). For example, if the computed positions of an AP using a first AP (or first AP group) and a second AP (or second AP group) are within an acceptable error margin (e.g., within an acceptable distance of each other, such as, for example, 5 m, 8 m, etc.), despite the tokens not matching and the APs not "knowing" each other (e.g., not being valid neighbors), the computed positions are close enough that both the first and second APs or AP groups may be accepted as valid. Accordingly, the client, for example, may use both for determining its position.

8b. In an example embodiment, if computed positions are incompatible, the client uses its internal sensor estimations (dead reckoning, etc.) to arbitrate (at operation 621). For example, if a first AP identifies the client to be at position A (e.g., latitude X, longitude Y, altitude Z) and a second AP identifies the client to be at position B (e.g., latitude X, longitude Y, altitude Z+15 m), which is greater than an expected accuracy of the comparison of positions, the computed positions may be considered incompatible. Further to this example, the latitude and longitude were reported to be the same, but the altitude was different by 15 m, which in this example, is not within a threshold of acceptable difference. The threshold of acceptable difference may depend on the channel size, user expectations, and/or any other suitable considerations. In another example embodiment, the client parses through the list of SSIDs, and ranges against the next larger group of BSSIDs/SSID (as per operation 2 above). The client then computes its location using this second SSID, and compares against the competing dominant two groups. The client then discards, as per operation 7, the group that provided the wrong result (at operation 622).

9. The embodiments above can also be performed as "sting" operations by one or more APs on the main system, for detecting rogue APs (APs serving other SSIDs, or unknown APs serving the same SSID). Such detection can be performed at intervals or upon initial detection.

It is to be understood that the operational flow described above is only an example, and that the GPS attack prevention techniques presented herein may include use cases that include operational flows including some or all of the operations, additional operations, and/or alternative operations.

An attacker cannot readily conduct a GPS attack against a system implementing the GPS attack prevention techniques presented herein. In accordance with some embodiments, an isolated attacker cannot propose FTM services through an SSID different from that of the infrastructure. In accordance with some embodiments, an isolated attacker cannot propose FTM services by setting up an AP that spoofs the main SSID in the venue. An organized attacker may attempt to perform a GPS attack by deploying an infrastructure at least as large as the legitimate infrastructure; otherwise, a GPS attack is likely to be detected through rogue detection techniques presented herein. Even if an attacker were to deploy such an infrastructure, position information incoherent with that obtained from legitimate APs push the client to range against another system. As such, an attacker who does not deploy at least the dominant and second dominant networks may have difficulty achieving success.

Figure 7:
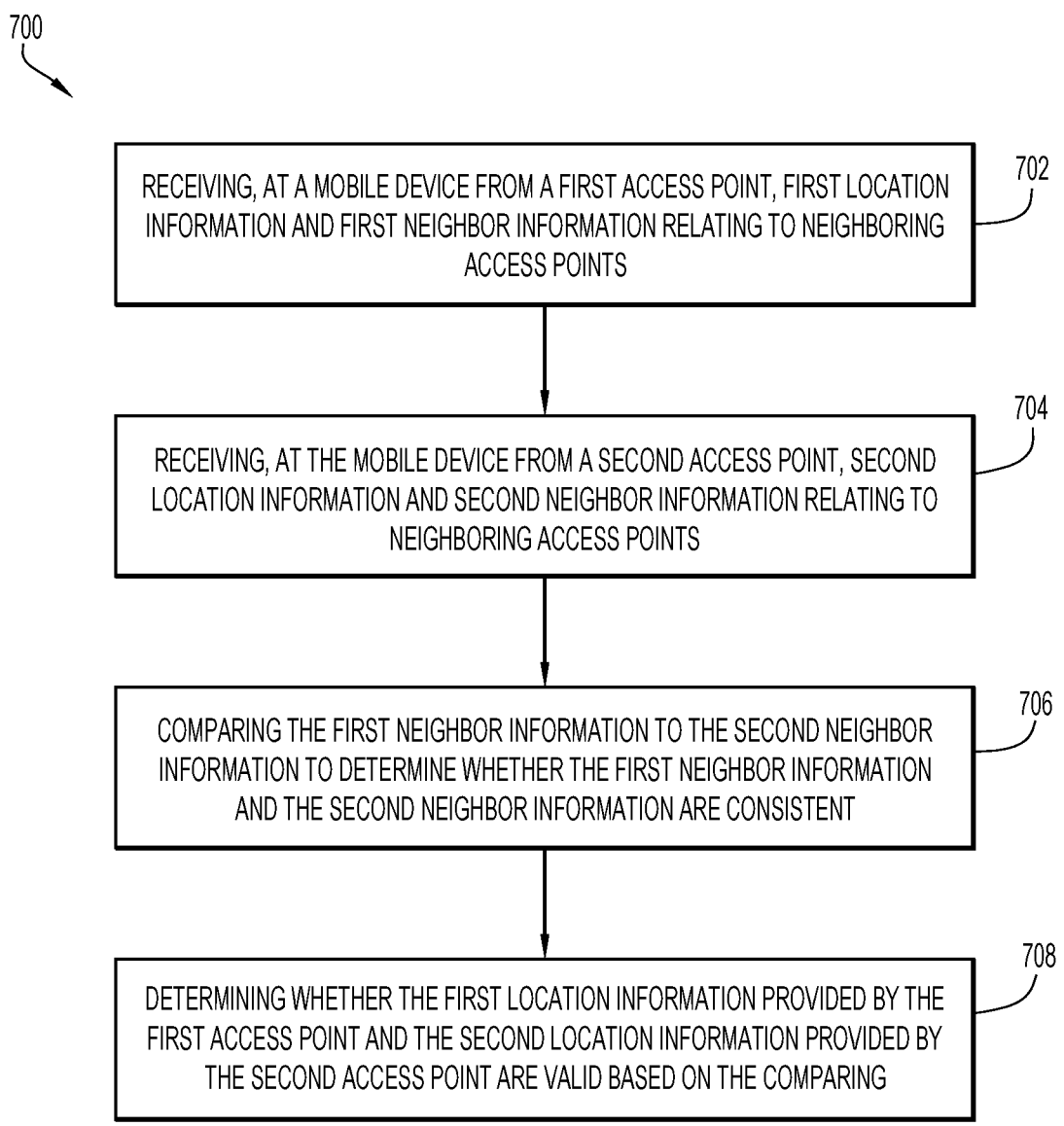
FIG. 7 is a flowchart of a method for determining validity of location information provided by access points based at least on neighbor information, according to an example embodiment.

FIG. 7 is a flowchart of a method 700 for determining validity of location information provided by access points based at least on neighbor list information, according to an example embodiment. In this embodiment, method 700 may start at 702, in which first location information and first neighbor information relating to neighboring access points are received at a mobile device from a first access point. At 704, second location information and second neighbor information relating to neighboring access points are received at the mobile device from a second access point.

In an example embodiment, receiving the first location information and receiving the second location information may be performed with respect to communications made as part of a wireless communication association process (e.g., a Protected Management Frames (PMF) process) or a wireless communication pre-association process (e.g., a pre-association security negotiation (PASN) process).

At 706, the first neighbor information is compared to the second neighbor information (e.g., by the mobile device) to determine whether the first neighbor information and the second neighbor information are consistent.

At 708, a determination is made (e.g., by the mobile device) as to whether the first location information provided by the first access point and the second location information provided by the second access point are valid based on the comparison at operation 708. For example, if the first neighbor information and the second neighbor information are determined to be consistent, it may be determined that the first location information provided by the first access point and the second location information provided by the second access point are valid. If the first neighbor information and the second neighbor information are determined to be inconsistent, it may be determined that at least one of the first location information provided by the first access point and the second location information provided by the second access point is invalid.

If it is determined that at least one of the first location information provided by the first access point and the second location information provided by the second access point is invalid, the first access point and the second access point may be flagged. For example, the mobile device may store data (e.g., a flag) indicating that the first access point may be or is invalid and/or may store data indicating that the second access point may be or is invalid. The data may be updated, modified, or removed based on neighbor information received from one or more other access points. For example, the neighbor information received from the other access point(s) may compared with the first neighbor information received from the first access point and/or the second neighbor information received from the second access point to determine whether it is consistent with either of the first or second neighbor information. If the neighbor information is determined to be consistent with the first neighbor information, for example, the data may be updated to indicate that the location information from the first access point is valid.

The mobile device may receive, from a third access point, third location information and third neighbor information relating to neighboring access points. The third neighbor information may be compared to the first neighbor information to determine whether the first neighbor information and the third neighbor information are consistent. The determination whether the first location information provided by the first access point and the second location information provided by the second access point are valid may be further based on whether the third neighbor information is consistent with the first neighbor information. For example, if the third neighbor information and the first neighbor information are consistent and the third neighbor information and the second neighbor information are inconsistent, the determination whether the first location information and the second location information are valid may include determine that the second access point provides invalid location information and the third access point and the first access point provide valid location information.

The mobile device may receive a first token from the first access point. The first token may be provided by the first access point together with the first location mobile device and/or the first neighbor information, or in a separate communication. The mobile device may receive a second token from the second access point. The mobile device may compare the first token to the second token to determine whether the first token and the second token are consistent.

In an example embodiment, the operation 708 of determining whether the first location information provided by the first access point and the second location information provided by the second access point are valid may be further based on whether the first token and the second token are consistent. If either (a) the first token and the second token are inconsistent or (b) the first neighbor information and the second neighbor information are inconsistent, the determining includes determining at least one of the first location information provided by the first access point and the second location information provided by the second access point are invalid. If the first token and the second token are consistent and the first neighbor information and the second neighbor information are consistent, the determining includes determining the first location information provided by the first access point and the second location information provided by the second access point are valid.

In an example embodiment, the mobile device may receive from the first access point, first lifetime data. The mobile device may receive from the second access point, second lifetime data. The first lifetime data may be compared to the second lifetime data to determine whether the first lifetime data and the second lifetime data are consistent. The determining may be further based on the comparing the first lifetime data to the second lifetime data and a current time.

In an example embodiment, the mobile device may derive information representing a number of access points operating with each of one or more wireless network identifiers. The mobile device may determine to perform a ranging procedure with those access points operating with a wireless network identifier, of the one or more wireless network identifiers that is used by a highest number of access points. wherein the information includes a number of BSSIDs of access points operating with each of one or more SSIDs.

Figure 8:
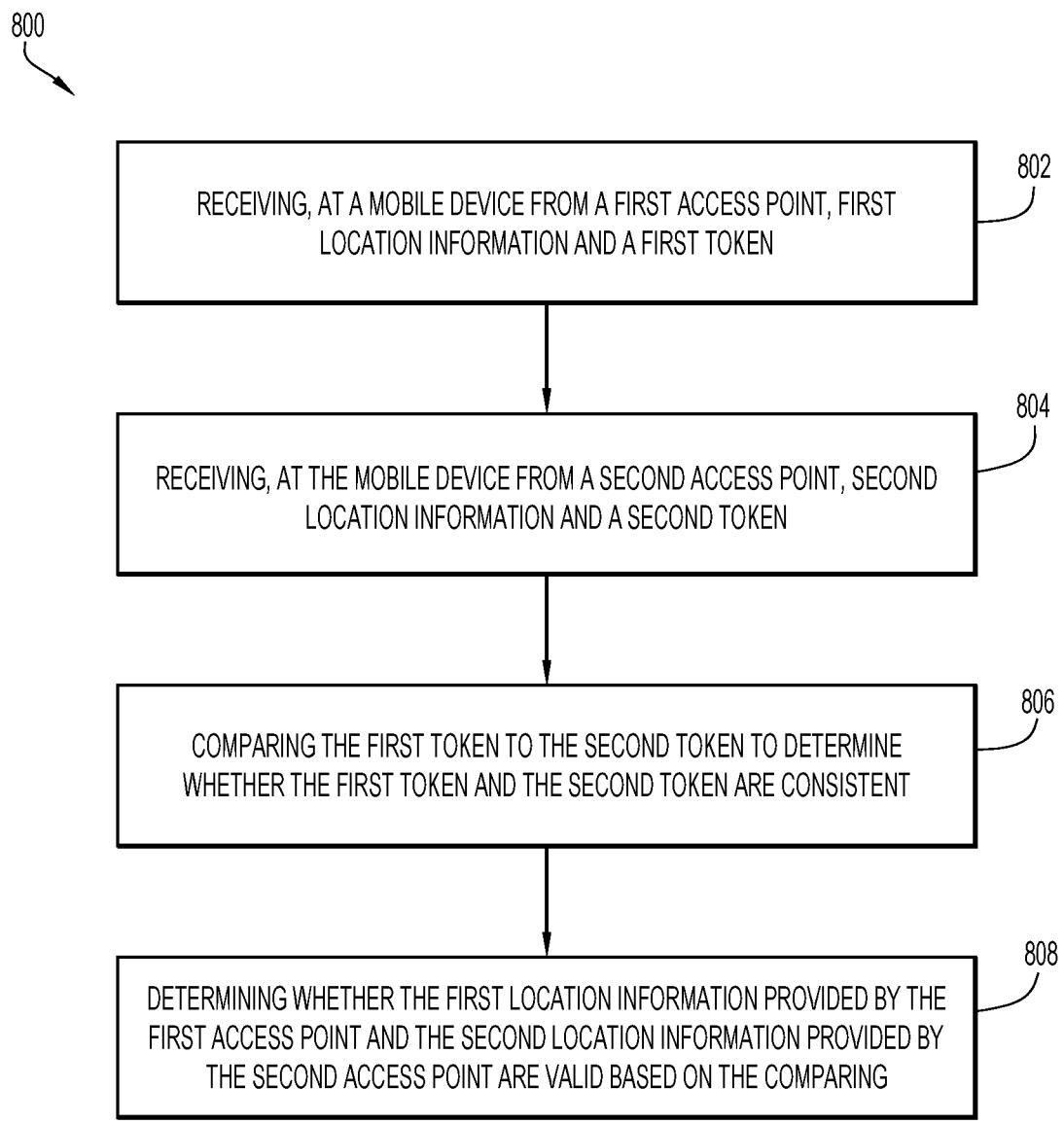
FIG. 8 is a flowchart of a method for determining validity of location information provided by access points based at least on tokens, according to an example embodiment.

FIG. 8 is a flowchart of a method 800 for determining validity of location information provided by access points based at least on tokens, according to an example embodiment. In this embodiment, method 800 may start at operation 802, in which first location information and a first token are received at a mobile device from a first access point. At operation 804, second location information and a second token are received at the mobile device from a second access point.

In an example embodiment, receiving the first location information at 802 and receiving the second location information at 804 may be performed with respect to communications made as part of a wireless communication association process (e.g., a Protected Management Frames (PMF) process) or a wireless communication pre-association process (e.g., a PASN process).

At 806, the first token and the second token may be compared to determine whether the first token and the second are consistent.

At 808, a determination is made whether the first location information provided by the first access point and the second location information provided by the second access are valid based on the comparison.

In an example embodiment, operation 808 of determining may include determining that the first location information provided by the first access point and the second location information provided by the second access point are valid if the first token and the second token are consistent. This may include determining that at least one of the first location information provided by the first access point and the second location information provided by the second point are invalid if the first token and the second token are inconsistent.

In an example embodiment, the mobile device may receive from the first access point, first neighbor information relating to neighboring access points, and the mobile device may receive from the second access point, second neighbor information relating to neighboring access points. The first neighbor information may be compared to the second neighbor information to determine whether the first neighbor information and the second neighbor information are consistent. The determination of whether the first location information and the second location information are valid may be further based on whether the first neighbor information and the second neighbor information are consistent. For example, the first location information may be valid if the first token and the second token are consistent and if the first neighbor information and the second neighbor information are consistent. For example, if either the first and second tokens are inconsistent or the first and second neighbor information are inconsistent, the first location information provided by the first access point and/or the second location information provided by the second access point may be invalid. To determine which of the first location information and/or the second location information is valid, if any, neighbor information from another access point may be used.

A neighbor list protection procedure may include the following steps: a STA may establish a PASN session with an access point having a BSSID of BSSID1. The STA may obtain a neighbor list with associated BSSIDs and LCIs from the access point. The STA may obtain a BSSID1 FTM Token. The STA may select BSSID2 from the neighbor list. The STA may establish a PASN session with an access point having a BSSID of BSSID2. The STA may query BSSID2 for BSSID1 FTM token. If the token is invalid, B S SID1 and BSSID2 may be flagged as incoherent. The STA may alternate between BSSID1 and BSSID2 groups until coherence is determined. In other words, the STA may establish PASN sessions with access points of different BSSIDs until coherence is achieved (e.g., a majority of consistent tokens and/or LCIs received from the access points). Once a coherent group is found, the incoherent group may be discarded.

In summary, a system and method are provided to overcome GPS-attacks, by which an attacker injects wrong ranging or location information (by pretending to be a valid AP offering FTM service and providing wrong location or ranging information) and leads the client to a wrong position computation. The system and method use link security to inform the client about valid neighbors, and the AP about the client. With this method, GPS attacks are mitigated, as an attacker needs to either disable the legitimate network, or implement two networks larger than the legitimate network in order to perform a successful GPS-attack.

Figure 9:
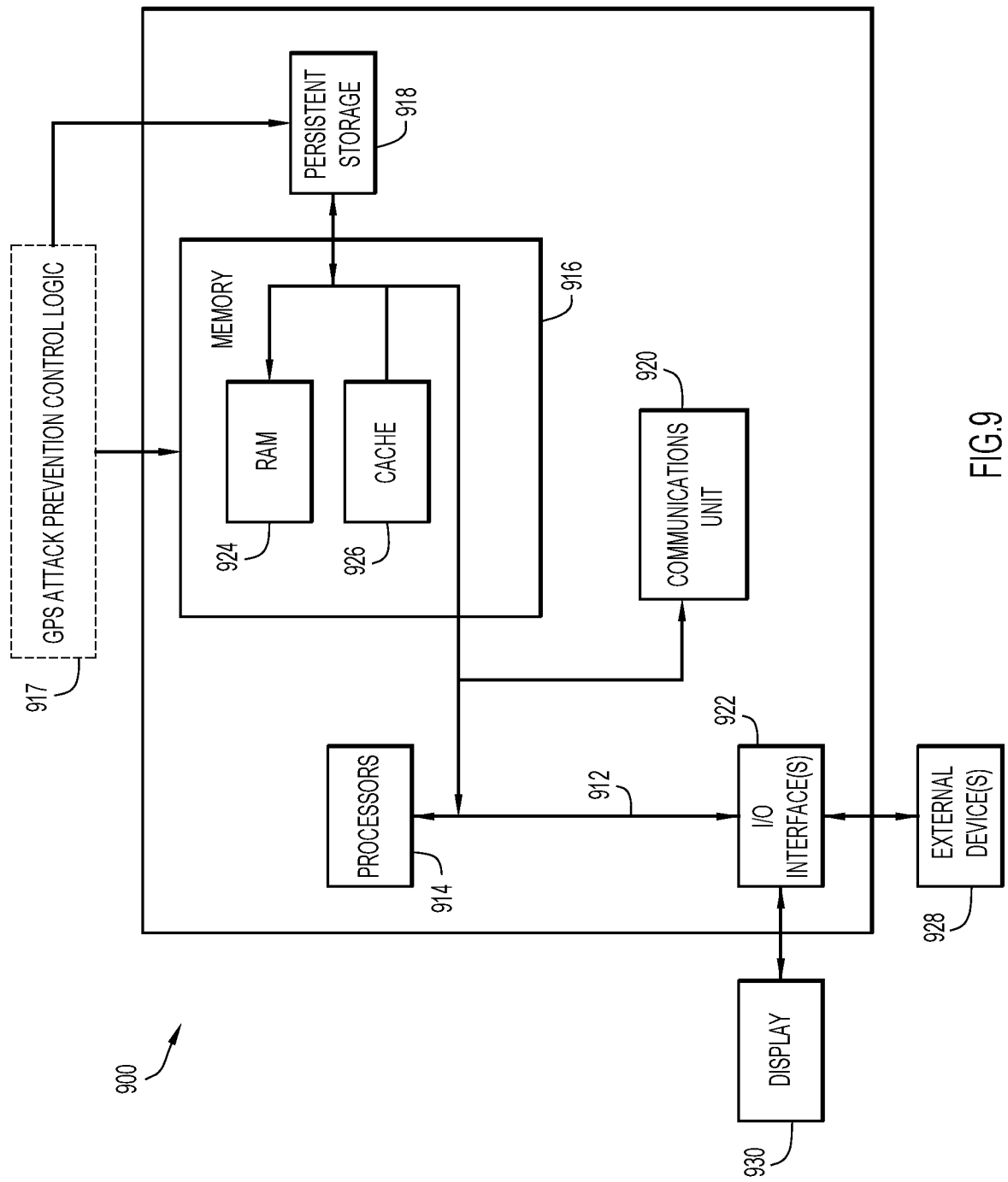
FIG. 9 is illustrates a hardware block diagram of a computing device that may perform the functions of a mobile device, a client, a station, an access point and/or a wireless local area network controller (WLC) referred to herein in connection with the techniques depicted in FIGS. 1-8.

FIG. 9 illustrates a hardware block diagram of a computing device 900 that may perform the functions of a mobile device, a client, a station, such as an ISTA or an RSTA, a wireless LAN controller, and/or an access point referred to herein in connection with the techniques depicted in FIGS. 1-8. It should be appreciated that FIG. 9 provides only an illustration of one embodiment and does not imply any limitations with regard to the environments in which different embodiments may be implemented. Many modifications to the depicted environment may be made.

As depicted, the computing device 900 includes a bus 912, which provides communications between computer processor(s) 914, memory 916, persistent storage 918, communications unit 920, and input/output (I/O) interface(s) 922. Bus 912 can be implemented with any architecture designed for passing data and/or control information between processors (such as microprocessors, communications and network processors, etc.), system memory, peripheral devices, and any other hardware components within a system. For example, bus 912 can be implemented with one or more buses.

Memory 916 and persistent storage 918 are computer readable storage media. In the depicted embodiment, memory 916 includes random access memory (RAM) 924 and cache memory 926. In general, memory 916 can include any suitable volatile or non-volatile computer readable storage media. Instructions for the GPS Attack Prevention Control Logic 917 may be stored in memory 916 or persistent storage 918 for execution by processor(s) 914.

One or more programs may be stored in persistent storage 918 for execution by one or more of the respective computer processors 914 via one or more memories of memory 916. The persistent storage 918 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 918 may also be removable. For example, a removable hard drive may be used for persistent storage 918. Other examples include optical and magnetic disks, thumb drives, and smart cards that are inserted into a drive for transfer onto another computer readable storage medium that is also part of persistent storage 918.

Communications unit 920, in these examples, provides for communications with other data processing systems or devices. In these examples, communications unit 920 includes one or more network interface cards. Communications unit 920 may provide communications through the use of either or both physical and wireless communications links. In one form, the communications unit 920 may include a radio transceiver and modem chips or chipsets that are configured to operate in accordance with a wireless standard, such as the IEEE 802.11 wireless standards and its enhancements, such as the IEEE 802.11az standard referred to here.

I/O interface(s) 922 allows for input and output of data with other devices that may be connected to computing device 900. For example, I/O interface 922 may provide a connection to external devices 928 such as a keyboard, keypad, a touch screen, and/or some other suitable input device. External devices 928 can also include portable computer readable storage media such as database systems, thumb drives, portable optical or magnetic disks, and memory cards.

Software and data used to practice embodiments can be stored on such portable computer readable storage media and can be loaded onto persistent storage 918 via I/O interface(s) 922. I/O interface(s) 922 may also connect to a display 930. Display 930 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, at a mobile device from a first access point, first location information and first neighbor information relating to neighboring access points;
receiving, at the mobile device from a second access point, second location information and second neighbor information relating to neighboring access points;
receiving, at the mobile device from the first access point, a first token;
receiving, at the mobile device, from the second access point, a second token;
comparing the first neighbor information to the second neighbor information to determine whether the first neighbor information and the second neighbor information are consistent; and
determining, within two times of a lifetime of at least one of the first token and the second token, whether the first location information provided by the first access point and the second location information provided by the second access point are valid based on the comparing.

2. The method of claim 1, wherein if the first neighbor information and the second neighbor information are consistent, the determining includes determining that the first location information provided by the first access point and the second location information provided by the second access point are valid; and
if the first neighbor information and the second neighbor information are inconsistent, the determining includes determining that at least one of the first location information provided by the first access point and the second location information provided by the second access point are invalid.

3. The method of claim 1, further comprising:
receiving, at the mobile device from a third access point, third location information and third neighbor information relating to neighboring access points; and
comparing the third neighbor information to the first neighbor information to determine whether the first neighbor information and the third neighbor information are consistent; and
wherein the determining further includes determining whether at least one of the first location information and the third location information are valid based on whether the third neighbor information is consistent with the first neighbor information.

4. The method of claim 3, further comprising:
if the third neighbor information and the first neighbor information are consistent and the third neighbor information and the second neighbor information are inconsistent, the determining includes determining the second access point provides invalid location information and the third access point and the first access point provide valid location information.

5. The method of claim 1, wherein the first neighbor information includes locations for each neighboring access point of the first access point, and the second neighbor information includes locations for each neighboring access point of the second access point, the comparing includes comparing the location for each neighboring access point of the first access point to the location for each neighboring access point of the second access point, and the determining is further based on the comparing of the location for each neighboring access point of the first access point to the location for each neighboring access point of the second access point.

6. The method of claim 1, further comprising:
comparing the first token to the second token to determine whether the first token and the second token are consistent; and
wherein the determining is further based on whether the first token and the second token are consistent.

7. The method of claim 6, wherein if either (a) the first token and the second token are inconsistent or (b) the first neighbor information and the second neighbor information are inconsistent, the determining includes determining at least one of the first location information provided by the first access point and the second location information provided by the second access point are invalid; and
if the first token and the second token are consistent and the first neighbor information and the second neighbor information are consistent, the determining includes determining the first location information provided by the first access point and the second location information provided by the second access point are valid.

8. The method of claim 6, further comprising:
receiving, at the mobile device from the first access point, first lifetime data;
receiving, at the mobile device from the second access point, second lifetime data; and
comparing the first lifetime data to the second lifetime data to determine whether the first lifetime data and the second lifetime data are consistent; and
wherein the determining is further based on the comparing the first lifetime data to the second lifetime data and a current time.

9. The method of claim 1, further comprising:
at the mobile device, deriving information representing a number of access points operating with each of one or more wireless network identifiers; and
determining to perform a ranging procedure with those access points operating with a wireless network identifier, of the one or more wireless network identifiers, that is used by a highest number of access points.

10. The method of claim 9, wherein the information includes a number of basic service set identifiers (BSSIDs) of access points operating with each of one or more service set identifiers (SSIDs).

11. The method of claim 1, wherein the receiving the first location information and the receiving the second location information are performed with respect to communications made as part of an association or pre-association process.

12. A method comprising:
receiving, at a mobile device from a first access point, first location information and a first token;
receiving, at the mobile device from a second access point, second location information and a second token;
comparing, within two times of a lifetime of at least one of the first token and the second token, the first token to the second token to determine whether the first token and the second token are consistent; and
determining whether the first location information provided by the first access point and the second location information provided by the second access point are valid based on the comparing.

13. The method of claim 12, further comprising:
receiving, at the mobile device from the first access point, first neighbor information relating to neighboring access points;
receiving, at the mobile device from the second access point, second neighbor information relating to neighboring access points; and comparing the first neighbor information to the second neighbor information to determine whether the first neighbor information and the second neighbor information are consistent; and wherein the determining is further based on whether the first neighbor information and the second neighbor information are consistent.

14. The method of claim 12, wherein if the first token and the second token are consistent, the determining includes determining that the first location information provided by the first access point and the second location information provided by the second access point are valid; and if the first token and the second token are inconsistent, the determining includes determining that at least one of the first location information provided by the first access point and the second location information provided by the second access point are invalid.

15. The method of claim 12, further comprising:

receiving, at the mobile device from a third access point, third location information and a third token; and comparing the third token to the first token to determine whether the first token and the third token are consistent; and wherein the determining further includes determining whether at least one of the first location information and the third location information are valid based on whether the third token is consistent with the first token.

16. A non-transitory computer-readable storage media encoded with instructions which, when executed by a processor of a mobile device, cause the processor to:

receive, at a mobile device from a first access point, first location information and first neighbor information relating to neighboring access points;

receive, at the mobile device from a second access point, second location information and second neighbor information relating to neighboring access points;

receive, at the mobile device from the first access point, a first token;

receive, at the mobile device, from the second access point, a second token;

compare the first neighbor information to the second neighbor information to determine whether the first neighbor information and the second neighbor information are consistent; and determine, within two times of a lifetime of at least one of the first token and the second token, whether the first location information provided by the first access point and the second location information provided by the second access point are valid based on the compare.

17. The non-transitory computer-readable storage media of claim 16, wherein if the first neighbor information and the second neighbor information are consistent, the instructions that cause the processor to determine include instructions that cause the processor to determine that the first location information provided by the first access point and the second location information provided by the second access point are valid; and if the first neighbor information and the second neighbor information are inconsistent, the instructions that cause the processor to determine include instructions that cause the processor to determine that at least one of the first location information provided by the first access point and the second location information provided by the second access point are invalid.

18. The non-transitory computer-readable storage media of claim 16, wherein the instructions further cause the processor to:

receive, at the mobile device from a third access point, third location information and third neighbor information relating to neighboring access points; and compare the third neighbor information to the first neighbor information to determine whether the first neighbor information and the third neighbor information are consistent; and wherein the instructions that cause the processor to determine include instructions that cause the processor to determine whether at least one of the first location information and the third location information are valid based on whether the third neighbor information is consistent with the first neighbor information.

19. The non-transitory computer-readable storage media of claim 16, wherein the first neighbor information includes locations for each neighboring access point of the first access point, and the second neighbor information includes locations for each neighboring access point of the second access point, the instructions that cause the processor to compare include instructions that cause the processor to compare the location for each neighboring access point of the first access point to the location for each neighboring access point of the second access point, and the instructions that cause the processor to determine include instructions that cause the processor to determine further based on a comparison of the location for each neighboring access point of the first access point to the location for each neighboring access point of the second access point.

20. The non-transitory computer-readable storage media of claim 16, wherein the instructions further cause the processor to:

derive information representing a number of access points operating with each of one or more wireless network identifiers; and determine to perform a ranging procedure with those access points operating with a wireless network identifier, of the one or more wireless network identifiers, that is used by a highest number of access points.

* * * * *